Oct. 28, 1969  H. ERNST  3,474,882
PREFABRICATED STRUCTURAL ELEMENTS, ESPECIALLY FOR
CONSTRUCTING A STAIRCASE, SCAFFOLD, OR THE LIKE
Filed Feb. 2, 1967  5 Sheets-Sheet 1

Herbert ERNST
INVENTOR

BY  Karl F. Ross
ATTORNEY

Oct. 28, 1969  H. ERNST  3,474,882
PREFABRICATED STRUCTURAL ELEMENTS, ESPECIALLY FOR
CONSTRUCTING A STAIRCASE, SCAFFOLD, OR THE LIKE
Filed Feb. 2, 1967  5 Sheets-Sheet 5

Herbert ERNST
INVENTOR

BY  Karl F. Ross
ATTORNEY

United States Patent Office 3,474,882
Patented Oct. 28, 1969

3,474,882
PREFABRICATED STRUCTURAL ELEMENTS, ESPECIALLY FOR CONSTRUCTING A STAIRCASE, SCAFFOLD, OR THE LIKE
Herbert Ernst, Wartbergsteige 109, Heilbronn (Neckar), Germany
Filed Feb. 2, 1967, Ser. No. 613,494
Claims priority, application Austria, Feb. 8, 1966, A 1,119/66
Int. Cl. E04f 11/02
U.S. Cl. 182—106
35 Claims

ABSTRACT OF THE DISCLOSURE

A staircase, scaffold or similar structure and angular structural elements for assembling the stringers or the like for such a structure.

BACKGROUND OF THE INVENTION

The present invention relates to prefabricated angular structural elements which may be employed for many different purposes and a plurality of which may especially be employed for assembling a staircase, stepladder, scaffold or the like and may, if desired, be turned at suitable angles about vertical axes relative to each other to produce an angular or winding structure, and it further relates to a staircase, stepladder, scaffold or similar structure which is composed of these and other prefabricated elements.

In designing and constructing staircases, there are always difficulties in matching them to predetermined dimensions of the buildings in which they are to be installed, especially insofar as most staircases differ from each other in inclination and therefore always require different stairs or different stair stringers. This necessity of matching each individual staircase and the stringers thereof to the prevailing conditions and requirements has so far rendered any serial or mass production of staircases impossible.

For producing staircases of the above-mentioned type, it has, for example, been proposed to employ stair stringers which are assembled of a number of structural parts and in which the tensile stresses occurring in this staircase are taken up by two parallel, obliquely inclined flat iron bars, while the compressive stresses are taken up by horizontal cast-iron connecting bars which support the stair planks. These flat iron bars and connecting bars together form one stair stringer which, statically speaking, forms a lattice girder. Apart from the fact that such a staircase construction is extremely complicated and expensive, the stair stringers thereof are adapted to be used only for constructing staircases of one particular inclination.

According to a further known development of the staircase structure as above described, each stair stringer is divided into individual parts each of which is associated with and supports one of the stair planks. These stringer parts are designed so as also to permit them to be assembled to form a curved or angular staircase by being adapted to be turned relative to each other about vertical axis. After these stringer parts are connected to each other by means of vertical bolts, each stringer likewise forms a lattice girder in which the tensile and compressive stresses are taken up by obliquely inclined and horizontal bars in the same manner as above described with reference to the other known staircase structure. It also applies to this further staircase structure that the dimensions of the stringer parts, which in this case are adapted to be turned relative to each other, that is, the height of the individual steps as well as their depth, are predetermined and fixed so that these stringer parts can also be employed only for constructing staircases of one particular inclination.

SUMMARY OF THE INVENTION

It is an object of the present invention to provide a prefabricated structural element which eliminates the above-mentioned disadvantages and may be employed especially for assembling a staircase or similar structure and a plurality of which may be quickly connected to each other so as to form stringers or the like of any suitable length and shape in accordance with the height, slope, and shape of the desired staircase or similar structure.

One of the important features of the invention for attaining this object consists in providing the individual structural elements forming the principal components of a staircase or similar structure in the form of rigid angular elements or double-angles of a tubular or other suitable cross section, the arms of which extend at substantially right angles to each other and which are to be connected in pairs to each other either directly or by means of intermediate connecting elements.

The particular design and construction of the angular elements according to the invention has the great advantage that the stair stringers which are assembled of these elements may be very easily adjusted so as to comply with the prevailing building conditions and dimensions without being dependent upon the support by the lateral walls of the stairwell, and it has the further advantage that the individual angular elements or stringer components may be prefabricated in a series or by mass production and that the required amounts of these elements may be easily transported to the building site by a truck or even by an ordinary passenger car. The assembly and adjustment of the individual elements or stringer components and the mounting of the stair planks thereon may be carried out very easily and quickly even by semi-skilled workers. In order to protect the stair planks from being damaged before the interior of the building is finished, it is advisable at first to place simple wooden boards on the stair stringers in place of the final stair planks and to secure these boards to the stringers by means of hooks, bolts, screws or the like. When the interior of the building is finished, these boards may be quickly replaced by the final stair planks.

According to a very preferred embodiment of the invention, each of these stringer components is provided in the form of Z-shaped double-angles in which the distance between the upper surfaces of the two parallel arms is either equal to the desired height or to the desired horizontal depth of each stair. While the horizontal arms of each double-angle are preferably made of a material of a rectangular cross section, the vertical arms thereof are preferably made in the form of a pair of tubes, one of which is adapted to be telescopically inserted into the corresponding tube of the adjacent double-angle. The outer tube is then preferably secured to the surface of the horizontal arm of the double-angle, for example, by welding.

If a supply of angular members or double-angles of different fixed dimensions is provided and these dimensions follow, for example, a graduated scale, it will be possible to erect a staircase of any desired inclination and length and any desired stair height in accordance with the particular conditions which might prevail in any building. The desired stair height may also be attained by the use of spacing elements which may be inserted between the adjacent stringer components which are to be connected to each other, that is, between the lower end of the outer tube of one stringer component and the upper wall of the horizontal arm of the adjacent stringer component.

In the past it has always been especially difficult and expensive to erect curved or winding staircases since they require very accurate preparatory work and also a very exact fitting of the stair stringers and stair steps at the building site. It is therefore another very important object of the present invention to produce and erect curved or winding staircases much more easily and quickly and at a much lower cost than has previously been possible. For attaining this object, the invention provides that the individual stringer components which are to be connected to each other at the building site are designed so as to permit them during the assembly to be turned about vertical axes relative to each other so that the complete stair stringers will then have a generally curving or helically winding shape. The stair planks may thereafter be placed upon and secured to these stair stringers in the same manner as above described with reference to straight stringers. A statically very simple and advantageous construction of such a curving staircase according to the present invention may be attained by adjusting the individual components of the inner stair stringer relative to each other so as to follow substantially the desired curving shape of the staircase, while the outer stair stringer consists of two intersecting stringer components, the ends of which projecting beyond the point of intersection are secured in a fixed position, for example, by being anchored in the walls of the stairwell.

The above-mentioned as well as additional features and advantages of the present invention will become more clearly apparent from the following detailed description thereof which is to be read with reference to the accompanying drawing, in which—

FIGURE 22 shows a diagrammatic side view of a footbridge which is composed of two staircases according to the invention extending in opposite directions; while

Figure 1:
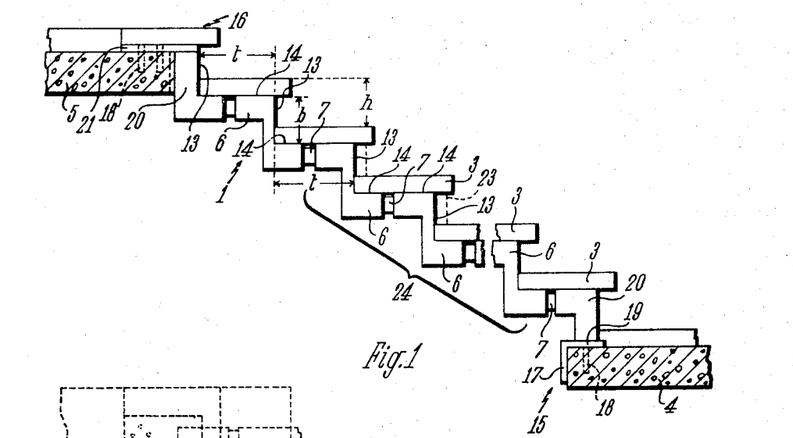
FIGURE 1 shows a diagrammatic side view of a straight staircase according to the invention.
Figures 2, 3, 4:
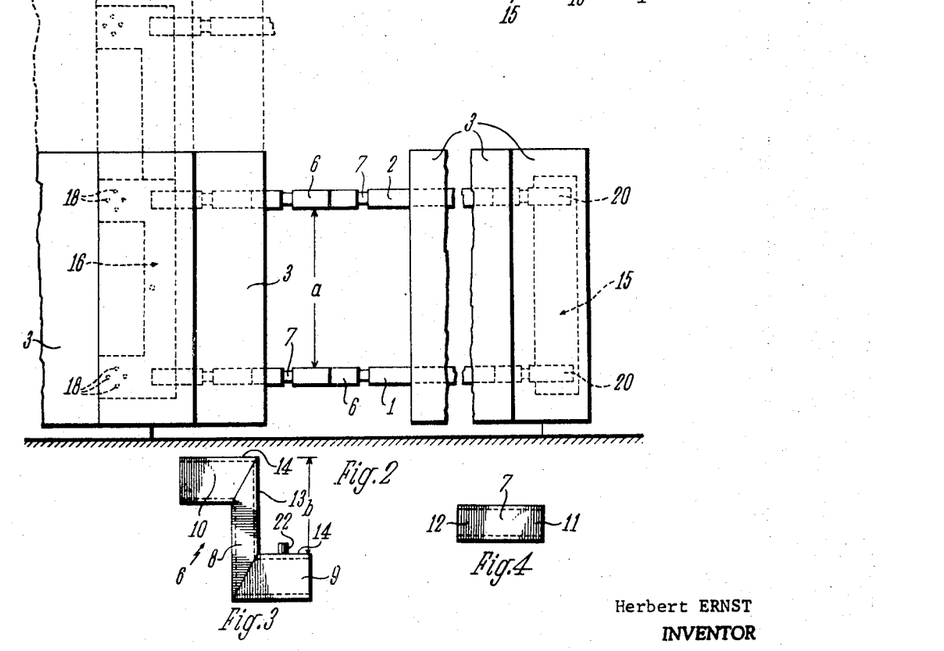
FIGURE 2 shows a top view of the staircase according to FIGURE 1.
FIGURES 3 and 4, respectively, show a side view of a double-angle and of a connecting element between two adjacent double-angles.

The staircase according to the invention as illustrated in FIGURES 1 and 2 in the assembled condition consists of two parallel stair stringers 1 and 2 which are spaced at a distance $a$ from each other (FIG. 2), and of the stair planks 3 which are mounted on these stair stringers so as to extend transversely thereto. The two stair stringers 1 and 2 which are supported by the lower stair landing 4 and the upper stair landing 5 are composed of a number of individual components 6 and 7.

As illustrated particularly in FIGURE 3, each stringer component 6 forms a Z-shaped double-angle, the central part 8 of which carries a lower arm 9 and an upper arm 10, while each stringer component 7 serves as a connecting member between two adjacent double-angles 6. The double-angles 6 as well as the connecting members 7 are made of a material of a U-shaped cross section and are of such dimensions that, for example, the right part 11 of a connecting member 7 may be inserted into the upper arm 10 of a double-angle 6 which is located at the right of this connecting member 7, while the left part 12 of this connecting member 7 may be inserted into the lower arm 9 of a double-angle 6 which is located at the left of the connecting member 7.

The depth $t$ of each step, as indicated in FIGURE 1, which is practically determined by the distance between the front end 13 of a double-angle 6 from the front edge 13 of the adjacent double-angle 6, depends upon the depth to which the two ends of the respective connecting member 7 are inserted into the associated arms 9 and 10 of the adjacent double-angles 6 which are to be connected by this member 7 to each other. The height $h$ of the steps is, however, determined by the distance $b$ between the two upper surfaces 14 of the lower arm 9 and the upper arm 10 of each double-angle 6, as shown particularly in FIGURE 3.

As may be seen particularly in FIGURE 2, the two stair stringers 1 and 2 are provided with a foot part 15 and a head part 16. The foot part 15 consists of an at least partly angular and possibly strip-shaped plate 17 which extends across both stair stringer 1 and 2 and is to be secured to the lower stair landing 4, for example, by downwardly projecting bolts 18 or the like which are embedded within the stair landing 4. The upper side of the horizontal arm 19 of this plate 17 is secured to a pair of angular members 20 which are spaced from each other at a distance $a$ between the two stringers 1 and 2. These angular members 20 serve as connecting members and they are therefore made of such a shape and of such dimensions in accordance with the double-angles 6 that the right parts 11 of the connecting members 7 on the lowest double-angles 6 may be inserted into these angular members 18.

The head part 16 is made similar to the foot part 16 and it is likewise provided with a flat, possibly strip-shaped and at least partly angular plate 21 which crosses both stair stringers 1 and 2 but is U-shaped, as indicated in dotted lines in FIGURE 1. This plate 21 is likewise secured by bolts 18 to the upper stair landing 5. The lower side of this plate 21 is also provided with angular members 20 which are again spaced from each other at the distance a between the stringers 1 and 2 and are adapted to receive the left parts 12 of the connecting members 7 on the upper double-angles 6.

Depending upon its width, a staircase of the type as above described may, of course, also be provided with more than two stair stringers, in which case the foot part 15 as well as the head part 16 would be provided with a corresponding number of angular members 20, as indicated in dotted lines in FIGURE 2.

The assembly and installation of the staircase as illustrated in FIGURE 1 may be carried out very easily and quickly by first mounting the foot part 15 on the lower stair landing 4, then fitting together the double-angles 6 and the connecting members 7 which together form the stair stringers 1 and 2, and by then connecting them to the angular members 20 of the foot part 15 and the head part 16. For constructing a staircase according to the invention in accordance with the prevailing building dimensions and the required height h of the stairs which, in turn, depends upon these prevailing dimensions, it is only necessary to have a supply of double angles 6 of different heights b available. The depth t of the stairs may, however, be varied in the manner as above described by inserting the ends 11 and 12 of the connecting members 7 into the double-angles 6 to the depth as required in the particular case. When the double-angles 6 and the connecting members 7 are inserted into each other in the prescribed manner and are also connected to the angular members 20 of the foot part 15 and the head part 16, it is advisable to lock the double-angles 6 and connecting members 7 to each other by riveting, bolting or welding so as to prevent them from subsequently sliding relative to each other. It is, however, also possible to screw or glue the double-angles 6 and the connecting members 7 to each other.

After the two stair stringers 1 and 2 have been assembled and adjusted in the above-mentioned manner, a stair plank 3 is applied upon the upper surface 14 of each pair of arms 9 and 10 of two adjacent double-angles 6 which are disposed within the same level. These stair planks 3 extend across the entire width of the staircase and may be screwed or clamped together with the arms 9 and 10 or even be glued to the upper surfaces 14 thereof. In order to prevent the stair planks 3 from sliding especially in lateral directions, the upper surfaces 14 of the arms 9 and 10 of the double-angles are preferably provided with upwardly projecting pins 22 which engage into corresponding recesses, not particularly shown, in the lower sides of the stair planks 3. If the staircase is further to be provided with back walls 23, the may be easily mounted on the front edges 13 of the double-angles 6 in the manner as indicated in dotted lines in FIGURE 1.

In the event that the height h as well as the depth t of the stairs are already known before the staircase is actually built, it may also be of advantage if already in the factory several of the double-angles 6 be combined with and secured to the required number of connecting members 7 so as to form a unitary structure 24 of an angular shape on which the necessary number of stair planks 3 may later be mounted. Such a unit 24 may then be extended at the place of erection of the staircase by means of additional double-angles 6 and connecting members 7 and the required head and foot parts 15 and 16 so as to form the stair stringers 1 and 2 of the particular staircase which is to be erected.

Figure 5:
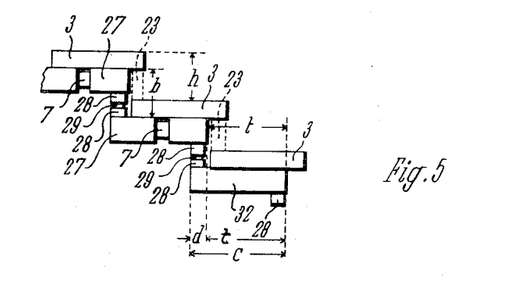
FIGURE 5 shows a diagrammatic side view of a part of a curving staircase according to the invention.
Figure 6:
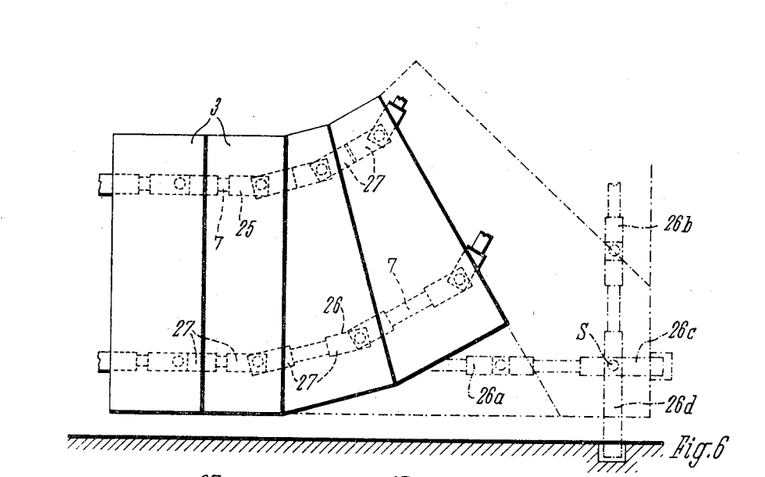
FIGURE 6 shows a top view of the staircase part according to FIGURE 5.

FIGURES 5 and 6 illustrate a modification of the staircase according to the invention in which a pair of generally curving stair stringers 25 and 26 is assembled of individual components similarly as described above with reference to FIGURES 1 and 2. However, in order to permit the individual components to be turned relative to each other about vertical axes so as to attain stair stringers 25 and 26 of a generally curving direction, the invention provides that, instead of the rigid double-angles 6 as employed in the stair stringers according to FIGURES 1 and 2, each double-angle according to FIGURES 5 and 6 consists of a pair of members 27 of a closed rectangular cross section each of which has a tubular projection 28 thereon which extends at a right angle thereto. The two members 27 are connected to each other by a stud 29 which is telescopically inserted therein and they may be turned about the axis of this stud 29 relative to each other so as to extend at different angles to each other in accordance with the desired curvature of the staircase.

If desired, it is also possible merely to make the inner stair stringer 25 of a curved shape, while the outer stringer 26 may consist of the two stringer parts 26a and 26b which extend parallel to the walls of the stairwall and cross each other at a point s and the ends 26c and 26d of which are secured to or within the walls of the stairwell, as indicated in FIGURE 6 in dot-and-dash lines.

Since the angularly curving stair stringers 25 and 26 do not form rigid integral elements, but consist of the angular members 27, the intermediate studs 29 and the connecting members 7, it is possible in this embodiment of the invention to vary the height h of the stairs or the distance b between them and also the depth t of the stairs to any desired extent. In order to permit a staircase of this type to be installed as quickly as possible, it is, however, advisable to have a supply of connecting studs 29 of different lengths available from which the studs of the required length may be quickly selected for immediate installation. After being inserted into the tubular parts 28 which project toward each other from the outer walls of the horizontal parts 31 of each pair of angular members 27, the two ends of each of these studs 29 should abut against these outer walls of the parts 31. Studs 29 will thus accurately determine the desired distance b and thus also the height h of the stairs.

Figure 7:
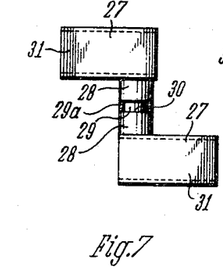
FIGURES 7 to 9 show side views of three different embodiments of a pair of angular elements which are adapted to be turned about a vertical axis to different angles relative to each other.

In stead of providing such a supply of connecting studs 29 of different lengths, it is also possible to make all of the connecting studs of a certain minimum length and either to extend them to the required length by the insertion of one or more spacing disks into the tubular part 28 on one of the horizontal parts 31 of each pair or to insert one or more spacing rings 29a between the opposite ends of the tubular parts 28 on each pair of horizontal parts 31, as illustrated in FIGURE 7, so as to fill out the annular space 30 between the ends of these tubular parts 28, the size of which depends upon the required height h of the stairs. It is also possible to vary the depth t of the stairs in a similar manner by the insertion of similar spacing elements between the opposite end surfaces of the horizontal parts 31 of each pair of laterally adjacent angular members 27.

Figure 8:
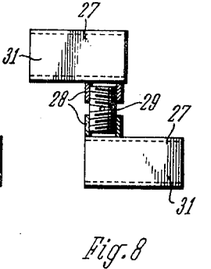
Figure 9:
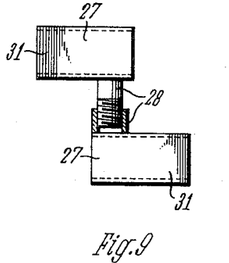

FIGURES 8 and 9 illustrate two modifications of the connecting studs 29 in the form of screws. According to FIGURE 8, the two ends of stud 29 are provided with right-hand and left-hand screw threads, respectively, and are screwed into the internal threads in the two tubular parts 28. It is, however, also possible as shown in FIGURE 9 to make the two tubular parts 28 of different diameters and then to screw them directly into each other.

If there is no need to vary the depth of the stairs, it is also possible in place of each pair of angular members 27 to employ a horizontal double-angle 32 as illustrated in FIGURE 5 provided the length c of the latter is greater than the desired depth t of each stair by the distance d which is slightly larger than the outer diameter of the tubular parts 28. If such double-angles 32 are employed, it is advisable to provide a supply of them of different lengths c so as to permit those of the proper length to be quickly selected for the particular staircase which is to be erected.

The installation of the angularly curving stair stringers 25 and 26 may be carried out in practically the same manner as that of the straight stringers, and in order to attain their generally curving shape it is merely necessary to turn the individual angular members 27 at certain angles relative to each other about the vertical axes of the connecting studs 29 and to insert longer connecting members 7 in one stair stringer 26 then in the other stringer 25.

Since for properly supporting the stair planks 3 it is not absolutely necessary that the stair stringers 25 and 26 extend exactly parallel to each other, it is also possible in the case of a curving staircase to combine several angular members 27 or double-angles 32 and connecting members 7 in the factor so as to form a rigid structural unit 24. Several double-angles 32 of each stair stringer 25 and 26 would then, however, be in a straight alignment with each other and be disposed at a greater angle to the adjacent double-angles.

Such a curved staircase is likewise to be provided with foot parts 15 and head parts 16 together with the required connecting angles 20. The installation of the stair stringers 25 and 26 and the mounting of the stair planks 3 thereon is carried out in the same manner as described with reference to FIGURES 1 to 4, and it is merely additionally necessary to turn the individual components 7 or 32 relative to each other in accordance with the desired angular curvature of the stair stringers 25 and 26 and possible also to secure the stringer ends 26c and 26d to or in the walls of the stairwell.

Figures 10, 11, 12, 13, 14, 15, 16:
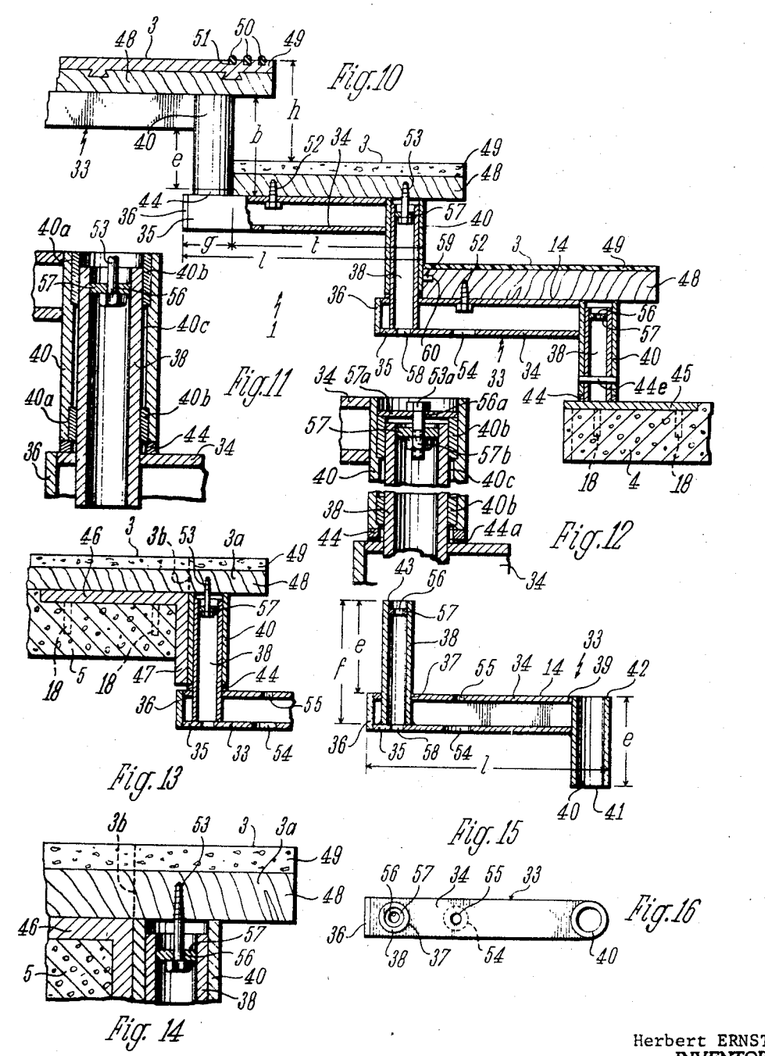
FIGURE 10 shows a side view, partly in vertical section, of a straight staircase according to a modification of the invention, in which the angular elements have a shape of horizontal double-angles.
FIGURE 11 shows a vertical section of the two telescoped tubular parts of two adjacent double-angles according to a modifiation of the invention.
FIGURE 12 shows a vertical section of a modification of the structure as shown in FIGURE 11.
FIGURE 13 shows a vertical section of the head part of the staircase according to FIGURE 10.
FIGURE 14 shows an enlarged view of a part of FIGURE 13.
FIGURES 15 and 16 show a vertical cross section and a top view of a horizontal double-angle according to FIGURE 10.

FIGURE 10 illustrates a modification of a staircase according to FIGURE 1, in which the same reference numerals are applied to designate those components which are equal or similar to the components of the staircase according to FIGURE 1. However, in this case a different kind of double-angles 33 are provided, one of which is shown in cross section in FIGURE 15 and in a top view in FIGURE 16. The horizontal part 34 of this double-angle 33 which has a constant length is made of a material of a square-shaped or oblong cross section and is covered at one end 35 by a face plate 36. The upper wall of this horizontal part 34 is provided with a circular aperture 37 through which an inner tube 38 which forms one of the arms of the double angle 33 projects into the horizontal part 34 and the lower end of which rests upon the bottom wall of this part 34 and may, for example, be welded thereto. The other end 39 of the horizontal part 34, however, is secured to an outer tube 40 which projects at a right angle downwardly therefrom and forms the other arm of the double angle 33.

These tubes 38 and 40 are made of such diameters as to permit the outer tube 40 of one double-angle to be slipped over the inner tube 38 of the adjacent double-angle 33 and to be telescopically slidable thereon with a tight fit. Tubes 40 and 38 are made, however, of such lengths that the inner tube 38 of one double-angle 33 when inserted into the outer tube 40 of the adjacent double-angle 33 will project beyond the upper surface of the horizontal part 34 of the adjacent double-angle 33 for a distance which is exactly equal to the length $e$ of the outer tube 40 so that the lower end 41 of the outer tube 40 of one double-angle 33 will rest firmly on the upper surface of the horizontal part 34 of the other double-angle 33 and the upper end surfaces 42 and 43 of both tubes 38 and 40 will be flush with the upper surface 14 of the horizontal part 34.

If, as illustrated in FIGURE 10, the height $h$ of the stairs which is determined by the distance $b$ should be made greater than the length $e$ of the outer tubes 40, suitable spacing rings 44 of the required thickness are to be slipped over the inner tubes 38 so as to serve as a support for the outer tube 40 which is subsequently slipped over the inner tube 38. If a supply of these spacing rings 44 of different thickness of, for example, 5 mm., 10 mm., 15 mm., etc. is provided, it is possible to adjust the stairs to any desired height $h$. The constant total length $l$ of each double-angle 33 is however, composed of the desired depth $t$ of each stair and the distance $g$ which, in turn, is determined by the distance between the outer side of the face plate 36 and the opposite outer side of the outer tube 40 which is slipped over the inner tube 38 of the adjacent double-angle 33. In order to permit the depth $t$ of the stairs to be varied when such double-angles 33 are employed, it is advisable also to provide a supply of these double-angles 33 of different lengths $l$ which vary, for example, by 5 mm., from each other. However, since the depth $t$ of the stairs only needs to be varied to a relatively small extent, it will usually not be necessary to provide three or four different lengths $l$ of double angles 33.

If a staircase with a larger number of stairs requires the inner tube 38 of each double-angle 33 to fit telescopically very tightly into the outer tube 40 of the adjacent double-angle 33 so that there is pratically no clearance between the outer surface of the inner tube 38 and the inner surface of the outer tube 40, both tubes would require to be very accurately machined which cannot be done without considerable cost. This disadvantage may, however, be overcome in the manner as illustrated in FIGURES 11 and 12 by providing the inner wall of the outer tube 40 adjacent to its opposite ends with annular recesses 40a into which bushings 40b are inserted which may be made, for example, of steel or nonferrous antifriction metal or even of plastic or another relatively soft material. After these bushings 40b are inserted into the outer tube 40, it will only be necessary to finish the inner surface of the bushings by a very simple operation, for example, by means of a reamer. The outer tube 40 of one double-angle 33 which is provided with such bushings 40b may then be easily slipped with a very close fit over the inner tube 38 of the adjacent double-angle 33. Since the two tubes 38 and 40 are made of such diameters that an annular gap 40c remains between them, the adjacent double-angles 33 will bear upon and support each other by the two intermediate bushings 40b.

If in addition it should be necessary to prevent the inner tubes 38 and outer tubes 40 from sliding in the axial direction and also from turning about their vertical axes relative to each other, this may be accomplished in the manner as illustrated in FIGURE 10 by means of one or several pins or rivets 44e which are inserted through the inner and outer tubes 38 and 40 and extend transversely to the common axis thereof.

The foot part for each stringer of the staircase according to FIGURE 10 is provided in the form of a simple flat plate 45 which may be secured by bolts 18 to or in the stair landing 4 and carries on its upper side an inner tube 38 upon which the outer tube 40 of the lowest double-angle 33 is fitted. If necessary, this plate 45 may, of course, also be of an angular cross section, as indicated in dotted lines in FIGURE 10.

The head part for each stringer of this staircase structure is, however, provided in the form of an angle iron 46, as illustrated in FIGURE 13, which may be secured by bolts 18 to the stair landing 5 and the vertical arm 47 of which is secured to a connecting member in the form of an outer tube 40 which may be fitted over the inner tube 38 of the uppermost double-angle 33.

In order to mount the uppermost stair plank 3 so that its upper surface will be on the same level as, and connected without interruption to, the upper surface of the adjacent stair landing, the uppermost stair plank 3 preferably consists only of the front strip 3a, the rear edge of which, as indicated in FIGURES 13 and 14 by the dotted line 3b, is in vertical alignment with the front side of the vertical arm 47 of the angular head part 46. The outer tube 40 serving as a connecting member may then be welded at a lower or higher level to the head part 46 in order to compensate for a difference in thickness between the front strip 3a and the rear part of the uppermost stair plank.

Each stair plank 3 which is to be placed upon the upper surface 14 of the horizontal part 34 of each double-angle 33 and upon the upper end surface 42 of the outer tube 40 is provided on this staircase in the form of a compound or laminated plank which consists of the interconnected layers 48 and 49. At least the lower layer 48 of this compound plank 3 is designed so as to be able to take up tensile stresses. Thus, as illustrated in FIGURE 10 in cross section, each of the stair planks 3 is provided with a lower layer 48 which may consist, for example, of high-grade wood or the like and carries an upper layer 49 which may consist of a highly wear-resistant material, for example, marble, asbestos cement, or a layer of plastic. If special nonskid strips 50 are required, they may be inserted into longitudinal grooves 51 which are then provided in the upper layers 49.

The above-mentioned stair planks 3 may be securely connected to the horizontal parts 34 of the individual double-angles 33 by means of screws 52 and 53 which are screwed from below into the lower plates 48 of the stair planks 3. As illustrated in FIGURES 10 and 15, the horizontal part 34 is provided with two vertically aligned apertures 54 and 56 for inserting the screw 52, while for supporting the screw 53 a small disk 57 which is provided with a bore 56 is welded into the upper end of the inner tube 38. Screw 53 is inserted into the inner tube 38 through a bore 58 in the lower horizontal wall of the double-angle 33 and it is screwed by a suitable tool into the lower plate 48 of the compound stair plank 3. The tension which is exerted by the screw 53 is then transmitted from the lower plate 48 of one stair plank 3 to the horizontal part 34 of the adjacent double-angle 33 and thus also to the outer tube 40 which is secured to the latter. This has the result that the outer tube 40 which is fitted over the inner tube 38 will be very firmly secured to the latter.

In place of the screws 53, it is also possible to employ bolts, not shown, which may be inserted from above through bores at least in the lower part 48 of the stair planks 3 so that the heads of these bolts are located within the stair planks, while the nuts on the bolts are tightened upon the lower wall of the double-angles 33, whereby the two tubes 38 and 40 are also secured to each other.

A similar manner of securing the inner tube 38 in the axial direction to the outer tube 40 is illustrated in FIGURE 12. The upper bushing 40b is in this case sunk for a short distance below the upper end of the outer tube 40 and a washer 57a is inserted into the recess which is thus formed and placed upon the upper end of bushing 40b, which in this case is made of plastic or another relatively soft material. This washer 57a then serves as a support for the head of a bolt 53a, the shank of which is inserted through the bore 56a of the washer and the bore in disk 57 and screwed into a nut 57b which is welded upon the lower side of disk 57. When this bolt 53a is tightened, not only the two tubes 38 and 40 are firmly secured in the axial direction to each other, but the upper edge of bushing 40b will be slightly upset. If in addition to the spacing ring 44 a sealing ring 44b is provided, the upset edge of bushing 40b and the sealing ring 44a will tightly seal the angular gap 40c which will protect the inner tube 38 and the inner wall of the outer tube 40 from corroding.

In place of or in addition to the screws 52 it is also possible to secure the stair planks 30 to the double-angles 33 by means of pins 59, as shown in FIGURE 1, which are secured to the outer surface of each outer tube 40 at a point facing the stair plank 3 and engage into recesses 60 in the end wall 60 of the stair planks 3.

Figure 17:
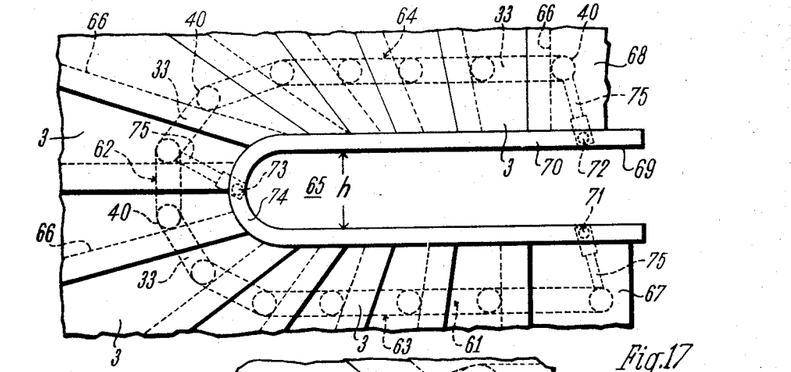
FIGURE 17 shows a digrammatic top view of a staircase which is winding about an angle of 180° and assembled of the angular elements according to the invention.

FIGURE 17 shows a top view of the inner part of a staircase which is turning about an angle of 180° and the inner stringer 61 of which is assembled of a plurality of double-angles 33 as previously described which are disposed relative to each other so as to form a substantially arcuate section 62 and two parallel longitudinal sections 63 and 64. By making the inner stair stringer 61 of this shape and by making the outer stringer, not shown in FIGURE 17, of a corresponding shape and extending it parallel to the stringer 61, a vertical clearance or well 65 of a width h will be attained between the banisters of the two straight stair sections.

The stair planks 3 are placed upon the individual double-angles 33 in such a manner that the rear edges 66 thereof abut against the outer surfaces of the outer tubes 40 of these double-angles 33. The lower and upper stair landings are designated by the numerals 67 and 68.

This turning staircase is provided with a prefabricated railing 69 which consists of a continuous hand rail 70 and three rail posts 71, 72 and 73. While the two posts 71 and 72 are mounted within the areas of the landings 67 and 68, the third post 73 is mounted substantially underneath the center of the curved section 74 of the hand rail 70. The hand rail is thus supported at three points which permits the three rail posts 71 to 73 and the hand rail 70 for a staircase of certain slope to be prefabricated and to be easily installed.

Figures 18, 19:
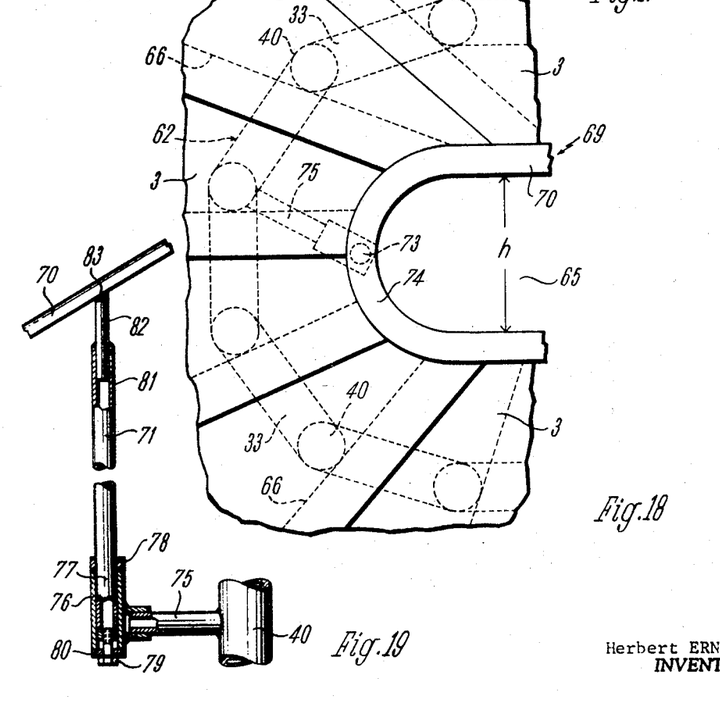
FIGURE 18 shows an enlarged view of a part of the staircase according to FIGURE 17.
FIGURE 19 shows, partly broken away and in section, a side view of a railing support and a part of a handrail.

As illustrated in FIGURE 19, each of the posts 71 to 73 is adapted to be connected to a horizontal supporting arm 75 which may be welded easily and quickly to the outer surface of the outer tube 40 of the adjacent double-angle 33. The outer end of the supporting arm 75 is secured to a vertical socket 76 into which the lower end 77 of the post 71 is inserted which is made of a tubular material. This lower end 77 of the post is provided with a flange 78 which rests on the upper end of socket 76. For securing the post 71 to socket 76, the lower end of the latter carries a washer 80 through the bore of which a headed screw 79 is inserted and screwed into a thread in the end 77 of post 71. When this screw 79 is tightened, post 71 and socket 76 will therefore be firmly secured to each other.

FIGURE 19 further illustrates that a connecting rod 82 is inserted into and slidable axially within the upper part 81 of the tubular post 71, and that the hand rail 70 is welded to the inclined upper end of this rod 82.

For assembling this railing 69, at first the three required supporting points for the hand rail 70 are marked and thereafter the supporting arms 75 carry the vertical sockets 76 are welded to the outer tubes 40 of the adjacent double-angles 33. When this has been done, the tubular posts 71 to 73 are inserted into the sockets 76 of the supporting arms 75 and secured thereto by the screws 79. Thereafter, the connecting rods 82 on hand rail 70 are inserted into the upper parts 81 of posts 71 to 73 and, after the hand rail 70 has been adjusted in accordance with the slope of the staircase, the connecting rods 82 are welded together with the upper parts 81 of posts 71 to 73.

The simple manner of securing the hand rail 70 at only three points and the almost symmetrical shape of this rail permit the railing 69 to be very easily and quickly instaled without requiring any additional adjustment work. If it ever becomes necessary, for example, when large objects such as furniture or the like have to be carried along this staircase, it is possible to remove the entire railing 69 and very quickly and easily by removing the screws 79 and pulling the posts 71 to 73 out of the sockets 76 and subsequently to secure it again as firmly as it was previously secured.

Particular construction of the railing 69 also permits it to be adjusted to staircases of diffreent slopes. The three connecting rods 82 on the same hand rail then only need to be raised or lowered to the required height within the tubular posts 71 to 73 in accordance with the desired slope before they are welded to the posts. Since the slope of a particular staircase to be built is, however, generally known and determined by the prefabricated double-angles 33, the hand rail 70 and its connecting elements may also be prefabricated so as to be in accordance with this slope.

Figure 20:
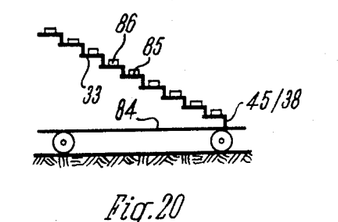
FIGURES 20 and 21 show a diagrammatic side view and top view of a mobile stairway which is constructed of the angular elements according to the invention.
Figure 21:
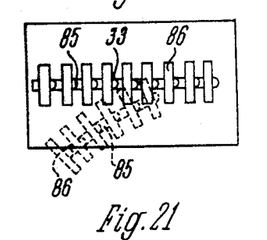

FIGURES 20 to 24 finally illustrate some of the numerous other possibilities in which the structural elements according to the invention, i.e. the double-angles 33, may be employed. Thus, for example, FIGURES 20 and 21 illustrate diagrammatically a mobile stairway as often used for installations and other work and for entering and leaving airplanes. Similarly as described with reference to FIGURE 10, a foot plate 45 is secured to the undercarriage 84 of this mobile stairway and carries an inner tube 38 upon which the first of a series of double-angles 33 is fitted which together form a stair stringer 85 and each of which carries a stair plate 86 projecting toward both sides thereof. The number of double-angles 33 which may thus be attached to each other is optional and depends upon the particular use of the stairway as long as it does not cause the undercarriage to tilt over. Since the stairway only has a single stringer 85, its individual components 33 together with the stair plates 86 may also be turned relative to each other to different angles, as indicated in dotted lines in FIGURE 12. These components may be made of a sufficient strength so that the entire stairway is self-supporting, at least as long as it does not have to carry an additional load, namely, that of a person ascending the stairs. In any event, if its upper end is supported on a fixed point, this mobile stairway will support the weight of a number of persons.

Figure 22:
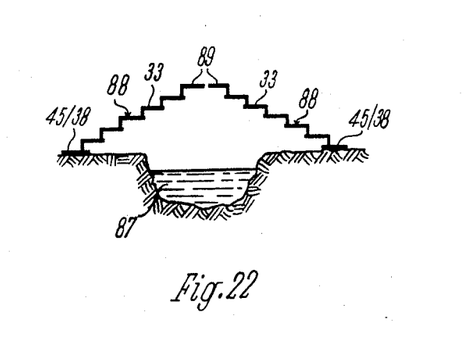

FIGURE 22 illustrates the use of two stairways 88 according to the invention which extend in opposite directions toward each other and the upper ends 89 of which are braced on each other so as to form a foot-bridge, for example, over a brook or the like 87. The lowest double-angles 33 are also in this case fitted over the supporting tubes 38 which are anchored by plates 45 to the ground, whereupon the following double-angles 33 are connected and secured to each other in the same manner as previously described. By employing these double-angles 33 it is also possible to build a footbridge in which the opposite stringers have a different height in order to compensate for a difference between the level of the ground at both sides of the brook 87.

Figure 23:
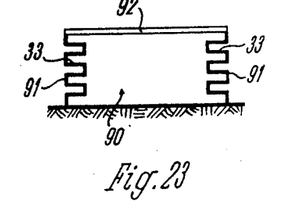
FIGURES 23 and 24 show diagrammatic side views of two different scaffolds or the like which are likewise constructed of the angular elements according to the invention.
Figure 24:
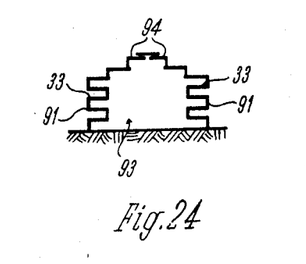

As illustrated in FIGURES 23 and 24, it is also possible to employ the double-angles 33 for assembling scaffolds or supports for erecting elevated platforms or the like. The scaffold as shown in FIGURE 23 is composed of four posts 91 which are assembled of double-angles 33 and support a platform 92. The scaffold as illustrated in FIGURE 24, however, is composed only of double-angles 33 and the individual posts 91 are then connected to each other by the upper double-angles 94 and thus form a very solid structure.

Although my invention has been illustrated and described with reference to the preferred embodiments thereof, I wish to have it understood that it is in no way limited to the details of such embodiments but is capable of numreous modifications within the scope of the appended claims.

Having thus fully disclosed my invention, what I claim is:

1. Structural elements forming a plurality of substantially equal components adapted to be connected to each other so as to form a stringer of a staircase, stepladder, scaffold or the like and each comprising adjacent pairs of substantially Z-shaped double angles, and means for securing said double-angles of each pair to each other and to at least one adjacent pair, each of said double-angles comprising a rigid central member and a pair of parallel tubluar arms connected to said central member near the opposite ends thereof projecting in opposite directions therefrom and at right angles thereto and adapted to be telescopically connected and then rigidly secured to one of the tubular arms of another double-angle of the same type.

2. Structural elements as defined in claim 1, in which said central member forms an element separate from at least one of said arms and is telescopically connected to said one of said arms and adapted to be turned relative to the other arm and then to be rigidly secured thereto.

3. Structural elements as defined in claim 2, in which at least one of said arms has a screw thread with an axis extending at a substantially right angle to the axis of said arm, said central member having a screw thread at least at one end thereof adapted to be screwed together with said screw thread of said arm.

4. Structural elements as defined in claim 2, further comprising at least one spacing member intermediate said arms of one double-angle.

5. Structural elements as defined in claim 1, in which said central member and said arms of each double-angle are integral with each other.

6. Structural elements as defined in claim 1, in which a first of said arms of each double-angle has an outer diameter substantially corresponding to the inner diameter of the second arm and is adapted to be fitted over the second arm of another double-angle of the same type.

7. Structural elements as defined in claim 6, in which said first arm of one of said double-angles and said second arm of the adjacent double-angle which are telescopically connected to each other have corresponding transverse bores, and further comprising a connecting member inserted into said bores for rigidly securing said two arms to each other.

8. Structural elements as defined in claim 6, in which said second arm of each double-angle projects into said central member near one end thereof, and said first arm is secured to the end surface of the other end of said central member.

9. Structural elements as defined in claim 6, further comprising at least one spacing member intermediate one end of said first arm of one double-angle and the adjacent lateral surface of said central member of the adjacent double-angle over the second arm of which said first arm is fitted.

10. Structural elements as defined in claim 6, wherein said central member of each double-angle serves as a supporting surface for carrying a stair plank, and further comprising means for securing said stair plank to said central member and for also securing two adjacent double-angles to each other, said means comprising a transverse wall secured to said second tubular arm of each double-angle near its end facing the bottom side of said stair plank carried by said central member of an adjacent double-angle, and threaded means securing said stair plank to said transverse wall.

11. Structural elements as defined in claim 6, further comprising means for securing the first arm of one of said double-angles to the second arm of the adjacent double-angle inserted into said first arm, said means comprising first and second transverse walls secured to said first arm said second arm, respectively, near their ends adjacent to the upper surface of said central member, and threaded means for securing said two walls to each other.

12. Structural elements as defined in claim 1, in which said arms of each double-angle have the same diameter and further comprising a connecting member adapted to be telescopically inserted into and to be rigidly secured to the adjacent arms of two double-angles.

13. A structural elements as defined in claim 1, in which a first of said arms of each double-angle has at least end portions of a larger inner diameter than the outer diameter of the second arm, and further comprising a pair of bushings inserted into said end portions of said first arm and having an outer diameter substantially equal to the inner diameter of said end portion and an inner diameter substantially equal to the outer diameter of said second arm.

14. Structural elements as defined in claim 1, in which said central member is likewise tubular and has a substantially rectangular cross section, said arms having a circular cross section.

15. Structural elements as defined in claim 1, in which the planes of the free outer end surfaces of each arm of one double-angle are disposed within substantially parallel planes spaced from each other at a distance substantially equal to the height between two adjacent stairs of a stiarcase.

16. Structural elements as defined in claim 1, in which the maximum distance between said arms of each double-angle is equal to the horizontal depth of a stair of a staircase.

17. Structural elements as defined in claim 1, in which said arms and said central member of each double-angle have different lengths.

18. Structural elements as defined in claim 1, wherein said central member of each double-angle serves as a supporting surface for carrying a stair plank, and further comprising means for securing said stair plank to said central member.

19. Structural elements as defined in claim 18, wherein said means project laterally from the arm of one of said double-angles upon the outer surface of which the longitudinal end surface of said stair plank abuts and extends into said end surface.

20. Structural elements as defined in claim 18, wherein said means comprise a transverse wall secured to the tubular arm of one of said double-angle near its end facing the bottom side of said stair plank carried by said central member, and threaded means securing said stair plank to said transverse wall.

21. A staircase comprising at least one stair stringer composed of a plurality of prefabricated Z-shaped double-angles each comprising a central horizontal member and a pair of parallel vertical arms secured to said central member near the opposite ends thereof and respectively projecting upwardly and downwardly therefrom, and means for securing the adjacent doubles-angles to each other so as to form a zigzag-shaped stringer, each of said arms being tubular and adapted to be telescopically connected and then rigidly secured to one of the tubular arms of an adjacent double-angle of the same type.

22. A staircase as defined in claim 21, further comprising a railing, said railing comprising a hand rail extending respectively secured to the highest and lowest arms of said stringer for securing said stringer respectively to an upper and lower stair landing.

23. A staircase as defined in claim 21, in which at least two adjacent double-angles of said stringer are turned relative to each other about the axes of said arms so that said stringer has an angular or angularly curving shape for forming a curving staircase.

24. A staircase as defined in claim 21, further comprising a railing, said railing comprising a hand rale extending substantially parallel to the adjacent stair stringer, and a plurality of posts secured at their lower ends at least indirectly to said stringer, each of said posts comprising a tubular member, and a rod-shaped member secured at its upper end to said hand rail and having its lower part inserted into the upper end of said tubular member, and means for securing said rod-shaped member to said tubular member at a level depending upon the height and inclination of said hand rail.

25. A staircase as defined in claim 24, in which at least three of said posts are provided to which said hand rail is adapted to be secured, two of said posts being mounted near the opposite ends of said curving stringer and the third post being mounted substantially underneath the center of the curvature of said hand rail so that by varying the depth of insertion of said rod-shaped members of said end posts into their tubular members relative to the depth of insertion of said rod-shaped member of said central post, said hand rail may be easily adjusted to a different slope.

26. A staircase as defined in claim 23, further comprising a railing, said railing comprising a hand rail extending substantially parallel to the adjacent stringer, and a plurality of posts each comprising a vertical socket secured to said stair stringer, a tubular member having a lower end inserted into said socket, threaded means for removably securing said tubular member to said socket, and a rod-shaped member secured at its upper end to said hand rail and having its lower end slidably inserted into the upper end of said tubular member and means for securing said rod-shaped member to said tubular member at a level depending upon the height and inclination of said hand rail.

27. A staircase as defined in claim 21, comprising at least an outer stringer and an inner stringer, a plurality of adjacent double-angles of said inner stringer being turned relative to each other about the axes of said arms so that said inner stringer has an angularly curving shape, said outer stringer being composed of at least two sections each comprising a plurality of double-angles extending in a straight direction substantially parallel to one wall of the stairwell and to another wall extending at a right angle thereto, respectively, said two sections intersecting each other near the connection of said two walls, and means for securing the end of each section to the wall extending at right angles to said section.

28. A staircase as defined in claim 21, in which a first of said arms of each double-angle of said stringer has an outer diameter substantially corresponding to the inner diameter of the second arm and fitted over and secured to the second arm of an adjacent double-angle of the same type, and further comprising a top member and a bottom member for said stringer for securing said stringer to an upper and a lower stair landing, each of said top and bottom members comprising a horizontal connecting plate and a vertical tubular arm secured at one end of said connecting plate and telescopically connected to the highest and lowest end arms of said stringer, respectively, and means for securing said connecting plate to a stair landing.

29. A staircase as defined in claim 28 having at least two of said stringers spaced laterally from each other, at least one of said connecting plates having at least two of said vertical tubular arms thereon telescopically connected to the corresponding end arms of both stringers.

30. A staircase as defined in claim 21, further comprising a stair plank on each central horizontal member of said stringer, and screws extending through bores in said central members into the lower sides of said stair planks for securing said stair planks to said central members.

31. A staircase as defined in claim 21, further comprising a stair plank on and rigidly secured to each central horizontal member, each of said stair planks consisting of a plurality of layers of suitable materials superimposed upon and secured to each other.

32. A staircase as defined in claim 21, further comprising a stair plank substantially consisting of a moldable material secured to each of said stair planks by being molded thereon.

33. A structure forming a mobile stepladder or the like comprising an undercarriage having wheels, at least one stringer secured to its lower end to said undercarriage and composed of a plurality of prefabricated Z-shaped double-angles, each of said double-angles comprising a central horizontal member and a pair of tubular vertical arms secured to said central member near its opposite ends and respectively projecting upwardly and downwardly therefrom and each adapted to be telescopically connected to one of the tubular arms of an adjacent double-angle, thereafter to be turned to any desired angle about its vertical axis relative to said adjacent double-angle, and then to be rigidly secured thereto, and a stair plate secured to each of said central members.

34. A bridgelike structure comprising at least two stringers inclined in opposite directions to each other and adapted to be connected to each other at their upper ends and each adapted to be assembled of a plurality of prefabricated Z-shaped double-angles, each of said double-angles comprising a central horizontal member and a pair of tubular vertical arms secured to said central member near its opposite ends and respectively projecting upwardly and downwardly therefrom and each adapted to be telescopically connected to one of the tubular arms of an adjacent double-angle and then to be rigidly secured to said adjacent double-angle.

35. A structure forming a scaffold or the like comprising at least two substantially vertical supports and means adapted to connect the upper ends of said supports to each other so as to form a platform, each of said supports being composed of a plurality of prefabricated Z-shaped double-angles, each of said double-angles comprising a central horizontal member and a pair of tubular vertical arms secured to said central member near its opposite ends and respectively projecting upwardly and downwardly therefrom and each adapted to be telescopically connected to and removable from one of the tubular arms of an adjacent double-angle, and after being connected to be rigidly secured to said adjacent double-angle.

References Cited

UNITED STATES PATENTS

| | | | |
|---|---|---|---|
| 11,032 | 10/1889 | Rieseck | 52—187 |
| 1,046,165 | 12/1912 | Farch | 52—182 |
| 1,419,019 | 6/1922 | Chapman | 52—189 |
| 2,190,446 | 2/1940 | Fioritto | 52—182 |
| 2,216,250 | 10/1940 | Nelson | 52—182 |
| 2,593,683 | 4/1952 | Lyons | 52—182 |
| 3,099,336 | 7/1963 | Hawkins | 52—182 |
| 3,114,941 | 12/1963 | Blum | 52—182 |
| 3,245,188 | 4/1966 | Evans | 182—178 |
| 3,307,653 | 3/1967 | Gnehm | 182—178 |

REINALDO P. MACHADO, Primary Examiner

U.S. Cl. X.R.

52—182; 182—178